United States Patent [19]
Peake

[11] Patent Number: 5,809,511
[45] Date of Patent: Sep. 15, 1998

[54] OUTBOARD DATA MIGRATION IN A VOLUME STACKING LIBRARY

[75] Inventor: Jonathan Wayne Peake, Tucson, Ariz.

[73] Assignee: International Business Machines Corporation, Armonk, N.Y.

[21] Appl. No.: 778,118

[22] Filed: Jan. 2, 1997

[51] Int. Cl.⁶ ................................................... G06F 17/30
[52] U.S. Cl. ......................... 707/204; 707/205; 711/209; 395/621; 395/750
[58] Field of Search ................................. 707/204, 201, 707/205; 711/209; 395/621, 750; 364/513; 360/92

[56] References Cited

U.S. PATENT DOCUMENTS

| 4,467,421 | 8/1984 | White | 364/200 |
|---|---|---|---|
| 4,638,424 | 1/1987 | Beglin et al. | 364/200 |
| 4,876,662 | 10/1989 | Pence | 364/900 |
| 4,928,245 | 5/1990 | Moy et al. | 364/513 |
| 4,932,826 | 6/1990 | Moy | 414/277 |
| 4,945,429 | 7/1990 | Munro et al. | 360/92 |
| 5,394,539 | 2/1995 | Neuhard et al. | 711/209 |
| 5,403,639 | 4/1995 | Belsan et al. | 707/204 |
| 5,432,656 | 7/1995 | Motoyama et al. | 360/69 |
| 5,455,926 | 10/1995 | Keele et al. | 395/404 |
| 5,613,154 | 3/1997 | Burke et al. | 395/621 |
| 5,666,532 | 9/1997 | Saks et al. | 707/205 |
| 5,715,452 | 2/1998 | Mori et al. | 707/201 |
| 5,715,464 | 2/1998 | Crump et al. | 395/750 |

OTHER PUBLICATIONS

Chow et al., "Full Volume Migration", *IBM Technical Disclosure Bulletin,* vol. 37, No. 9, Sep. 1994, pp. 297–298.

Primary Examiner—Thomas G. Black
Assistant Examiner—Charles L. Rones
Attorney, Agent, or Firm—Gray Cary Ware Freidenrich

[57] ABSTRACT

Data is migrated from source media to target media in an automated tape library, where identifiers associated with the data are obtained from the source media, and the data and associated identifiers are consolidated by storing data/identifier paris in substantially continuous form or the target media. A plurality of source media units, such as magnetic tape cartridges, are first loaded to the library. Each source media unit contains one or more data blocks and a machine-readable identifier associated with each data block. The machine-readable identifier, for example, may be embodied by a machine-readable code imprinted on a housing of the media unit, or a code stored on the media itself. The identifier for each data block is obtained using the corresponding source media. Multiple data blocks and identifiers may be consolidated onto a single output media unit. The data blocks and identifiers on each output media unit are written in substantially contiguous form on output media units; on each output media unit, data blocks and associated identifiers are positioned in a predetermined relationship relative to each other. For example, each identifier may precede the associated data block. A catalog is created or updated to map the data blocks among their respective output media units.

40 Claims, 4 Drawing Sheets

OUTBOARD DATA MIGRATION IN A VOLUME STACKING LIBRARY

BACKGROUND OF THE INVENTION

1. Field of the Invention

The present invention relates to data storage libraries that manage data storage media such as magnetic tape. More particularly, the invention concerns the migration of data from source media to target media, where identifiers associated with the data are obtained from the source media, and data and the associated identifiers are consolidated by storing them in substantially continuous form on target media.

2. Description of the Related Art

For many applications, magnetic or optical tape provides the storage medium of choice. Tape media are especially useful for data that must be stored for a long period of time, such as for historical or legal reasons. Tape media are also popular for shorter term storage (e.g., one to twelve months), typically for backups and data migrated from direct access storage devices ("DASDs"). One popular configuration of tape media is the tape cartridge, which is especially convenient for use in tape libraries because it is compact and modular.

In theory, tape cartridges can be an economical way to store data. Unfortunately, in actual practice most tape management schemes store a small block of related data per tape cartridge, this data typically occupying less than 50 Mb. However, many commercially available tape cartridges today are capable of storing 800 Mb, and others are capable of storing more than 25 Gb. Accordingly, only a small fraction of the storage capability of the tape is used. Therefore, the data occupies substantially more tape cartridges than it would if multiple unrelated blocks of data were consolidated on a single tape cartridge. As a result, the conventional storage of data or tape cartridges requires high cost per unit of stored data.

In recent years, automated tape libraries have been introduced to reduce some of the costs of tape storage by eliminating tape operators and the manual handling of tape. However, automated libraries do not improve utilization of the tape cartridges' storage capability.

The initial cost of storing data involves the costs of the tape cartridge, CPU time, tape device usage, handling by tape operators, etc. After this initial cost is spent, storage of the cartridge still continues to incur various costs, such as rack storage space, tape cartridge climate control, access costs, etc. Many of the cartridges are originally written in automated libraries, requiring a customer system administrator to periodically evaluate cartridges in the library, identifying cartridges whose infrequent use warrants removing them from the limited capacity of the automated library. Additional costs are required to remove these low-access cartridges from the library and house them in external storage shelves. The foregoing factors drastically increase the real cost of storing data on tape. Accordingly, cost reduction motivates engineers to continually develop new ways to more efficiently store data on tape.

One known way to more efficiently store data on tape involves volume stacking. Volume stacking refers to the consolidation of multiple separate blocks of data, otherwise stored on separate tape cartridges ("volumes"), on a single tape cartridge. Volume stacking effectively multiples the number of available storage cells in an automated library by placing multiple customer volumes on a single physical volume. As an example, a typical customer may have 100,000 cartridges, each containing an average of 50 Mb of active data. The total active data is 5 Tb. If the data is migrated onto cartridges with a capacity of 10 Gb, only 500 tape cartridges are needed. This represents a reduction of 200:1. With such a reduction, it may even be economically feasible to maintain infrequently accessed data in an automated system, and reap the full cost and operational benefits of such systems.

For newly created data, volume stacking is easily implemented by directing data, upon receipt, into an automated library that practices volume stacking. However, it is significantly more difficult to "migrate" existing shelf data into volume-stacked format. One approach to perform such migration is to run a host application that mounts each volume in the library, and electronically copies the contents of the volume onto a volume and device inside the library. An example of this approach is the Mobius tape saver product. Although known approaches such as these may be suitable for some applications, they are significantly expensive in terms of system programmer, CPU, and tape operator resources required to handle potentially hundreds of thousands of tape cartridges. Namely, such approaches oversee consolidation of formerly separate groups of data, assign a new volume serial number ("volser") to the consolidated data, update a catalog to reflect the change in volser for each formerly separate block of data, and perform other related tasks. In addition to being time consuming, this approach does not work for data contained on volumes that are uncatalogued, since the volser necessarily changes during the copy process.

Another consideration during data migration is that cartridges handled by an automatic cartridge library normally require an external machine-readable label to identify the volume. Re-labeling existing cartridges with a machine-readable label, just to migrate them into the library, can be expensive and time consuming.

SUMMARY OF THE INVENTION

Broadly, the present invention concerns the migration of data from source tape media to target tape media, where identifiers associated with the data are obtained from the source tape media, and data and their associated identifiers are consolidated by storing them in substantially continuous form on target tape media.

In one embodiment of the invention, data is consolidated using an automated tape library. First, a plurality of source tape media units are loaded to a loading mechanism of the library. Each source tape media unit contains a data block, and provides a machine-readable identifier (such as a "volser") associated with the data block. The machine-readable identifier, for example, may be embodied by a machine-readable code imprinted on a housing of the tape media unit, or a code stored on the tape media itself, such as an IBM™ Standard or ANSI Standard tape label. The identifier for each data block is determined using the corresponding source tape media.

The data blocks and corresponding identifiers are consolidated onto one or more target tape media units, where each data group and associated identifier are stored together on the same target tape media unit. The data blocks and identifiers are written in substantially contiguous form on the target tape media units, data blocks and associated identifiers on each target tape media unit being positioned in a predetermined relationship relative to each other. For example, each identifier may be embodied by a header that precedes the associated data block. A catalog is created or updated to map the relationship between the data blocks and their associated target tape media units.

Accordingly, in one embodiment, the invention may be implemented to provide a method of migrating data, using operational steps such as those as discussed above. In another embodiment, the invention may be implemented to provide an apparatus for migrating data in accordance with the invention. In still another embodiment, the invention may be implemented to provide an article of manufacture comprising a data storage device tangibly embodying a program of machine-readable instructions executable by a digital data processing apparatus to perform method steps for migrating data in accordance with the invention.

The invention affords its users with a number of distinct advantages. Importantly, the invention may be implemented without requiring any customer, system programmer, or host resources are required to perform the migration process. Another advantage is that, instead of mounting each cartridge individually, an operator may load many cartridges at a time. The operator, for example, may load as many cartridges as possible with the capacity of the library's input facility. Another benefit of the invention is that it supports previously uncatalogued datasets, preserving the association between a data block's identifier (e.g., volser) and the original block of data. Moreover, the invention is convenient to use—since the original volser associated with a data block remains the same, migration of the data is transparent to customer applications such as tape management systems and job control language. In addition, the invention promotes efficiency because it does not require relabeling of migrated cartridges with a machine readable external label.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

Figure 1:
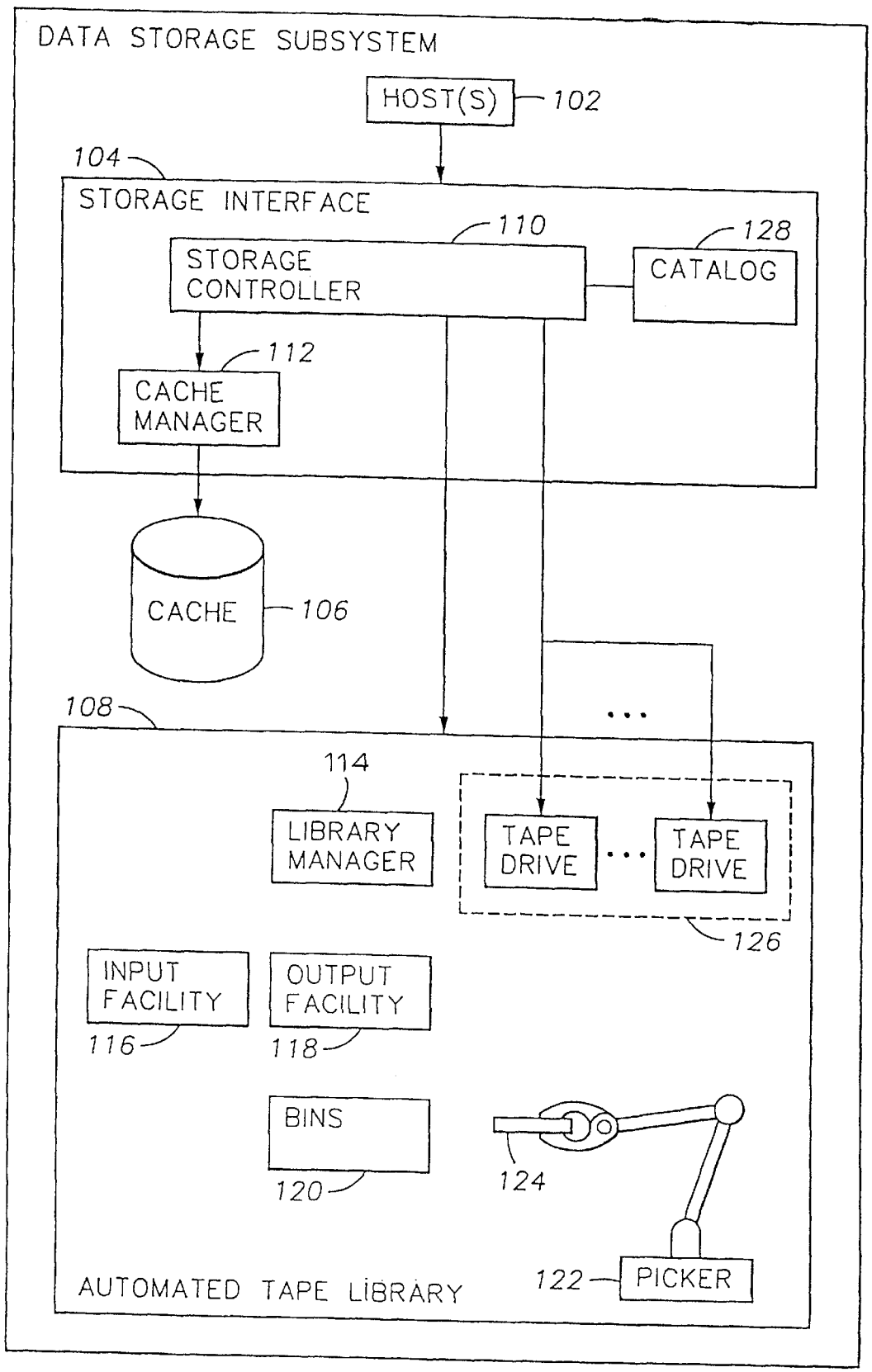
FIG. 1 is a block diagram of hardware components and interconnections in one exemplary embodiment of apparatus pursuant to the invention.

One aspect of the invention concerns a data migration apparatus, which may be embodied by various hardware configurations. One example is shown by the data storage subsystem 100, embodied by the hardware components and interconnections of FIG. 1. The subsystem 100 includes one or more hosts 102, a storage interface 104, and an automated tape library 108. Optionally, for reasons explained below, the subsystem 100 may also include a cache 106.

Broadly, the hosts 102 comprises one or more units that utilize data stored on the cache 106 and library 108. The storage interface 104 exchanges data between the hosts 102 and the cache 106, and between the hosts 102 and the library 108. These exchanges are conducted in accordance with commands from the host 102. The hosts 102 may be embodied by a variety of types and numbers of units, such as: mainframe or personal computers; workstations; user consoles, keyboards, or terminals; application programs; etc.

The automated tape library 108 comprises an apparatus that manages the storage, loading, unloading, movement, writing, and reading of tapes, such as the tape 124. The tapes 124 are stored in bins 120. A picker 122, such as robotic arm, selectively directs tapes 124 to an input facility 116, from an output facility 118, and to/from tape drives 126. The input facility 116, for example, may include a batch loading mechanism (not shown) for receiving tapes from an operator, along with one or more tape storage slots. Similarly, the output facility 118 may include a batch output mechanism (not shown) for transferring tapes from the library 108 to an operator, along with one or more tape storage slots.

The tape library 108 may comprise a new design, or a conventional tape library. As an example, the tape library 108 may comprise an IBM™ model 3494 tape library with at least (1) an IBM™ 3490 model C2A tape drive to access the following types of tapes: the IBM™ CST tape (standard cartridge system tape, 18 or 36 track format), and the IBM™ ECCST tape (enhanced capacity cartridge system tape, 36 track format), and (2) an IBM 3590 model B1A tape drive to access the IBM™ HPCT tape (high performance cartridge tape, 128 track format). The library 108 also includes a tape library manager 114, which oversees operations of the library 108, and may comprise a new design or a conventional manager for the specific configuration embodied by the library 108. In the illustrated example, the tape library manager 114 may comprise a the library manager used in the IBM model 3494 tape library.

The cache 106, an optional component, may be included in the subsystem 100 to provide a fast-access data storage location. As discussed in greater detail below, newly received data may be first stored in the cache 106, and then immediately migrated to the tape library 108 or migrated to the tape library 108 upon satisfaction of some criteria, such as a period or level of non-use. In an illustrative embodiment, the cache 106 may comprise a magnetic disk storage device such as a high data capacity "hard drive."

The storage interface 104 includes a storage controller 110, a cache manager 112, and a catalog 128. The cache manager 112 oversees operations of the cache 106, and may comprise a new design or a conventional manager for the type of data storage device embodied by the cache 106. In the illustrated example, the cache manager 112 may comprise a disk drive controller. The catalog 128 is used by the storage controller 110 to maintain information about the location of the data stored within the data storage subsystem 100.

The storage controller 110 directs operations of the managers 112/114 and also moves data to/from the tape drives 126. The storage controller 110 receives commands and data from the hosts 102, and issues appropriate commands to direct the managers 112/114 to take the necessary actions to execute the hosts' commands. The storage controller 110 may comprise a digital processing apparatus such as a microprocessor, personal computer, or more advanced processing machine.

OPERATION

In addition to the various hardware embodiments described above, a different aspect of the invention concerns a method for migrating data using an automated data storage library. Such a method may be implemented, for example, by operating the data storage subsystem 100 to execute a sequence of machine-readable instructions, as described below.

Data Storage Device

These machine-readable instructions may reside in various types of data storage media. In this respect, one aspect of the present invention concerns an article of manufacture, comprising a data storage medium tangibly embodying a program of machine-readable instructions executable by a digital data processor to perform method steps to migrate data in accordance with the invention.

Figure 2:
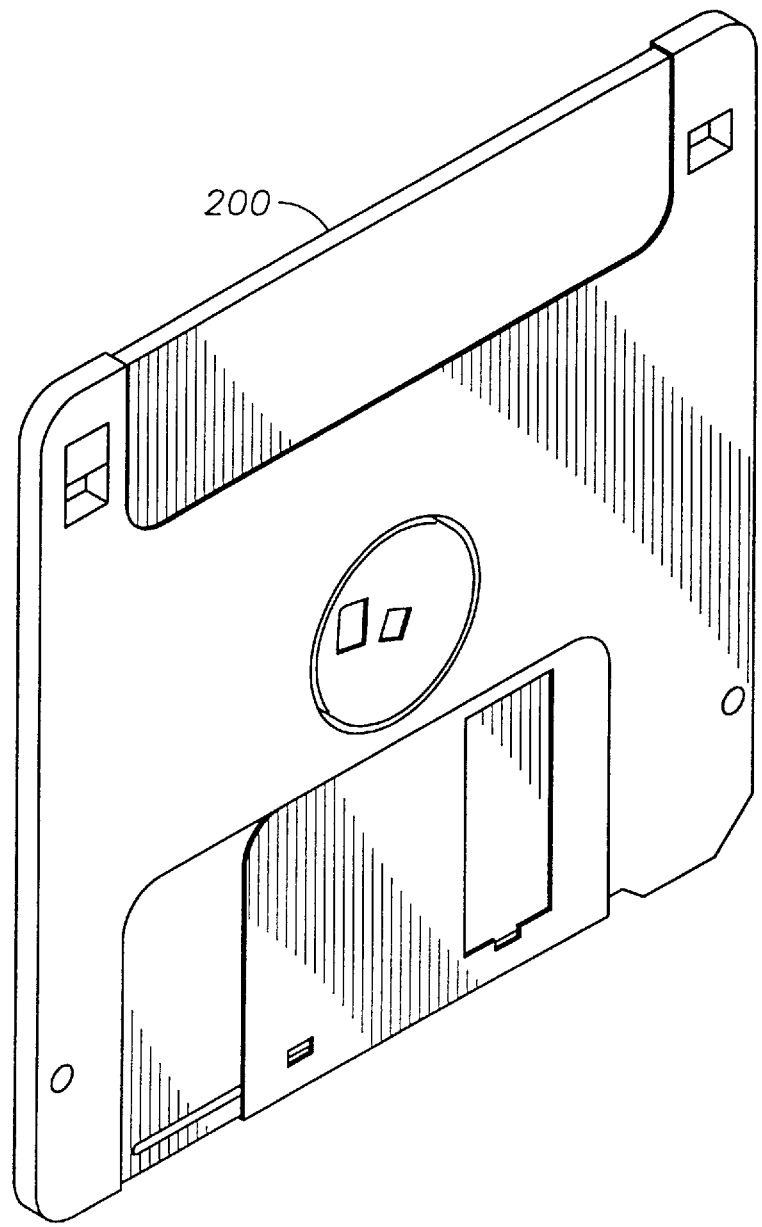
FIG. 2 is a diagram of an illustrative article of manufacture pursuant to the invention.

This data storage medium may comprise, for example, memory (not shown) such as RAM contained within the storage interface 104. Alternatively, the instructions may be contained in another data storage medium, such as a portable magnetic data storage diskette 200 (FIG. 2). Whether contained in the storage interface 104, the diskette 200, or elsewhere, the instructions may instead be stored on another type of data storage medium such as DASD storage (e.g., a conventional "hard drive" or a RAID array), magnetic tape, electronic read-only memory (e.g. ROM), optical storage device (e.g. WORM), paper "punch" cards, or other data storage media. In an illustrative embodiment of the invention, the machine-readable instructions may comprise lines of compiled "C" language code.

Sequence of Operation

As discussed above, the method aspect of the invention concerns the migration of data to target tape cartridges, where "identifiers" associated with blocks of the data are obtained from the source tape media, and the data blocks and their associated identifiers are consolidated by storing them in substantially contiguous form on target tape media. In one embodiment (described below), the input data is received from source tape cartridges, stored on the cache 106 in the form of "virtual" tape cartridges, and migrated on some predetermined schedule to target tape cartridges in the tape library.

In the illustrated example, each source tape cartridge includes one block of data and a corresponding machine-readable identifier, including information such as a volser associated with the data block. As an example, each identifier may be imprinted externally on the tape cartridge's housing, or provided by a code stored on the cartridge's tape media. Other information may be included as well, such as the type of information supplied by an IBM™ or ISO/ANSI type data label. Although not shown in the illustrated example, each source tape cartridge may include multiple data blocks with a corresponding number of machine-readable identifiers.

Tape Emulation

In a preferred embodiment, the storage interface 104 directs the cache 106 to store data newly received from the hosts 102, and also to read stored data in response to host requests. In the illustrated embodiment, the cache 106 emulates a tape storage system, while providing many advantages not available with tape, such as high speed storage, data appendibility, and the like. Additional information about tape emulation systems, many of which are well known in the art, is provided by the following references: (1) U.S. Pat. No. 4,467,421, entitled "Virtual Storage System & Methods", issued Aug. 21, 1984, and (2) U.S. patent application Ser. No. 08/707,891, entitled "Virtual Integrated Cartridge Loader for Virtual Tape Storage System", filed on Sep. 10, 1996 in the names of Carlson et al. The contents of the foregoing references are incorporated by reference.

Emulating a tape storage subsystem, the cache manager 112 maintains directory and other information necessary to store data on virtual tape cartridges contained in the cache 106. Each virtual cartridge corresponds to a volume of data, which in the present example includes a block of data formerly contained on one tape cartridge. Each virtual cartridge has an associated identifier. In the present example, where each cartridge media represents a volume, each identifier may include a volser. When data is migrated from the cache 106 to the library 108, the cache manager 112 provides the library 108 with the virtual cartridge's associated data to be migrated, along with each virtual cartridges identifier. The cache manager 112 also provides the catalog 128 with information about the location of the migrated data in the automated tape library.

Further detail of the structure, operation, and use of the cache 106 to emulate tape storage in communicating with the host should be apparent to those of ordinary skill in the art having the benefit of this disclosure and known virtual libraries, such as those cited above.

Data Migration From Tape to Cache

Figure 3:
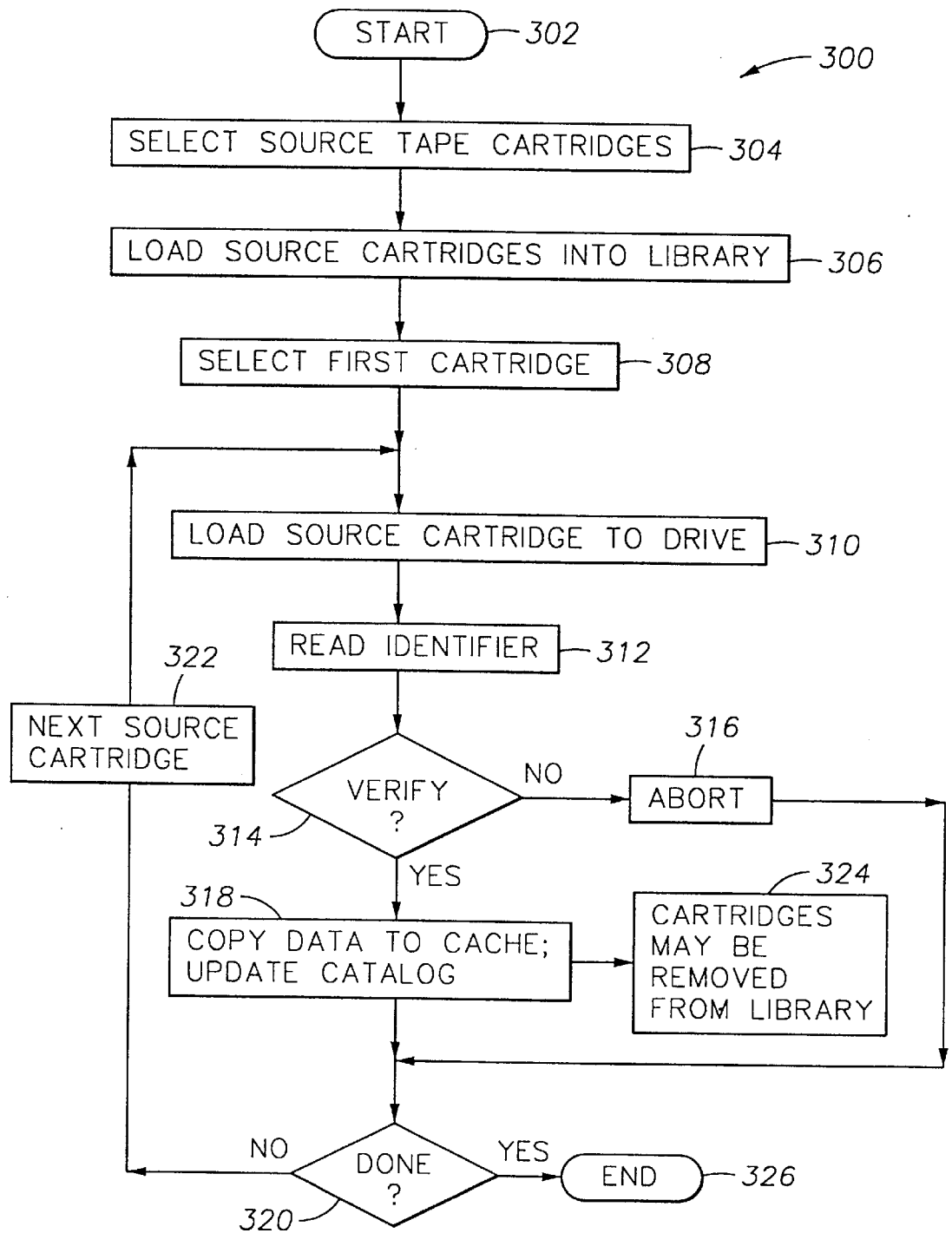
FIG. 3 is a flowchart depicting a sequence of operational steps used to migrate data from source tape cartridges to cache according to one exemplary embodiment of the invention.

According to one embodiment of the invention, data is introduced into the subsystem 100 according to the operational sequence 300 (FIG. 3). Broadly, the sequence 300 serves to receive source tapes, read their contents, and consolidate their contents on the cache 106. According to the invention, data is migrated from existing tape cartridges (not shown) that are (1) provided to the library by an operator (as illustrated), and/or (2) from tape cartridges already contained in the library (not shown). Importantly, data migration in accordance with the invention consolidates multiple virtual cartridges and their data on the cache 106, facilitating high speed storage and retrieval of data in the cache 106, appending of data in cache 106, and other benefits not available with tape systems. This procedure may be especially useful, for example, to consolidate data originally stored on tape cartridges previously initiated in an older model tape library or tape drive.

To provide an example of this process, FIG. 3 depicts a sequence 300 of method steps illustrating migration of data from source tape cartridges to the cache 106. For ease of explanation, but without any limitation intended thereby, the example of FIG. 3 is described in the context of the data storage subsystem 100 (FIG. 1) described above. After the sequence 300 begins in task 302, task 304 is performed to select source tape cartridges to migrate. In the illustrated embodiment, where an operator wishes to consolidate pre-existing ("old") tape cartridges, task 304 is performed by the operator identifying the old cartridges to be migrated. The old tape cartridges may utilize a number of different formats, such as IBM™ CST, IBM™ ECCST, and the IBM™ HPCT, and the like.

Next, in task 306, the old cartridges are loaded into the automated tape library 108. Namely, the operator gathers the cartridges and loads them into the tape library input facility 116. The number of source cartridges is limited only by the capacity of the library's input facility 116. As mentioned above, the input facility 116 may include a batch loading facility for this purpose, such as a input rack accessible to one or more tape drives 126 by use of the picker 122. Preferably, if a source cartridge is part of a multi-volume data group, all cartridges in the group are loaded into the input facility 116 together.

Next, task 308 begins migrating datasets from the old cartridges to cache 106, initially selecting a first one of the source tape cartridges. Task 308 may be initiated, for example, in response to a command issued by an operator. In task 310, the library 108 loads the selected cartridge to one of the tape drives 126. Although migration of datasets is performed one-by-one in the present example, multiple datasets may be migrated concurrently if the library 108 includes multiple tape drives 126.

After loading the selected cartridge in task 310, the tape drive 126 positions its read/write head at the beginning of the tape, and reads the cartridge's identifier in task 312. As mentioned above, each identifier includes at least the volser of the associated physical cartridge. Next, query 314 verifies the validity of the volser, and other applicable information in the identifier. If the verification of task 314 fails, task 316 aborts the migration of the presently loaded cartridge, and advances to query 320, which is discussed below. Task 316 may also make a record of the cartridge's "failed" status for subsequent operator notification.

If the verification of query 314 succeeds, task 318 copies the data of the presently loaded source cartridge onto a virtual cartridge in cache 106 with the same identifier as the source cartridge's identifier. Task 318 also updates the directory in the cache manager 112, listing the location in cache 106 of the data and its associated virtual cartridge. If no directory exists, task 318 creates the directory. As an option, task 318 may also enter the identifier of the copied data into an inventory. After a source cartridge's data is copied to cache 106 in task 318, the cartridge is unloaded by the tape drive 126, and the cartridge may be placed in the output facility 118. These cartridges may be removed from the library 108 as shown in task 324, or recycled by the library 108 for later use as empty cartridges.

After task 318, query 320 asks whether each source cartridge that was loaded in task 306 has been copied (or attempted) to cache 106. If not, the next cartridge is loaded in task 322, and tasks 310–320 are repeated. When query 320 determines that all source cartridges have been processed, the routine 300 ends in task 326.

Data Migration from Cache to Library

Figure 4:
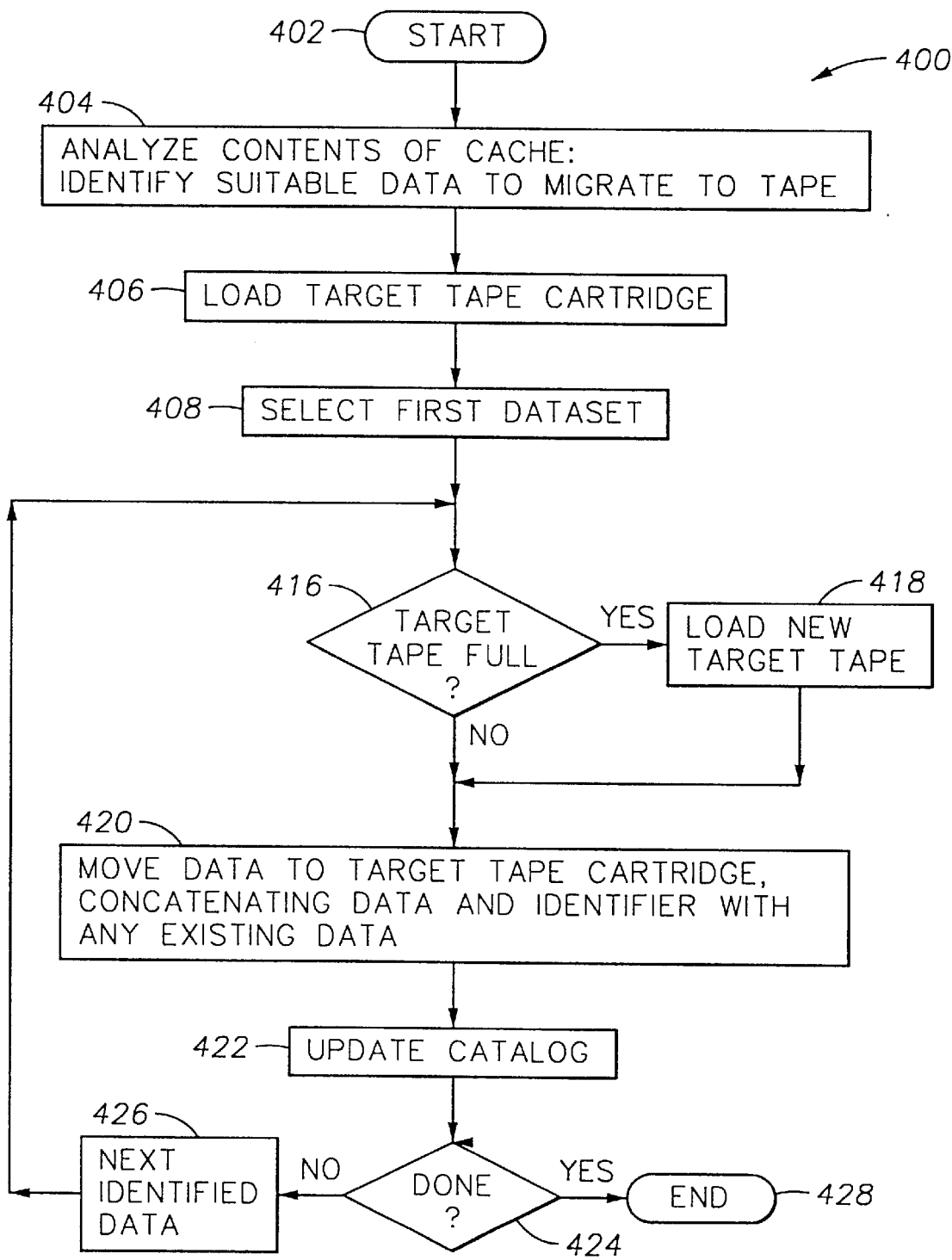
FIG. 4 is a flowchart depicting a sequence of operational steps used to migrate data from cache to an automated tape library according to one exemplary embodiment of the invention.

Another aspect of the present invention's method aspect involves migrating data from the cache 106 to target tape cartridges in the library 108. To provide an example of this process, FIG. 4 depicts a sequence 400 of method steps illustrating migration of data from the cache 106 to the library 108. For ease of explanation, but without any limitation intended thereby, the example of FIG. 4 is described in the context of the data storage subsystem 100 (FIG. 1) described above.

After the sequence 400 begins in task 402, task 404 analyzes the contents of the cache 106, identifying virtual cartridges and their associated data suitable for migrating to the tape library 108. In one embodiment all data from the cache 106 may be earmarked for migration to the library 108. Alternatively, each virtual cartridge may be migrated to a target cartridge immediately upon arrival of the virtual cartridge in the cache 106. Alternatively, active data being used by the host(s) 102 may be maintained in cache 106 while inactive data is migrated from source cartridges directly through the cache 106 to target cartridges in the library 108. As still another alternative, the analysis of task 404 may involve, for example, identification of the least-recently-used datasets, least-frequently-used datasets, or datasets of another appropriate classification. This rids the cache 106 of stale data, freeing cache storage space for data whose access is more likely. Task 404 may be performed according to a predetermined schedule, such as a periodic basis.

In task 406, the library 108 loads a target tape cartridge to a tape drive (not shown). The target tape cartridge will serve to receive and consolidate virtual cartridges and their associated data from the cache 106. Ultimately, the target tape cartridge will contain multiple blocks of data formerly stored separately on multiple different source tape cartridges. Although the target tape cartridge may utilize a number of different formats, it preferably utilizes a high-capacity modern format such as the IBM™ HPCT, mentioned above. Advantageously, outer surface of a target cartridge need not bear any volume-specific information about the cartridge's data contents, such as the identifier of the corresponding virtual cartridges. As explained herein, each source cartridge's identifier accompanies it throughout migration to the cache 106 and later to the library 108, the identifier being stored on the media itself. After task 406, task 408 initially selects a first one of the virtual cartridges and its associated data identified in task 404 for migration to the library 108.

Query 416 then determines whether the target cartridge can receive the present dataset. Preferably, each target cartridge is filled with as much data as the cartridge's data capacity will permit. If query 416 finds that the target cartridge does not have room to store the present dataset, the tape drive loads an empty target cartridge in task 418. After task 418 (or if the target cartridge was not full), task 420 transfers the data of the presently loaded source cartridge to the target cartridge. Along with the data, the data's identifier is also written to the target cartridge. Preferably, each data block and corresponding identifier is written to the target cartridge in a predetermined relationship to each other. For example, an identifier may substantially immediately precede its corresponding block of data. The data identifier combination is written along a data path defined by the target cartridge, such as single track, multiple unidirectional tracks, bi-directional serpentine pattern, or another predetermined path that traces the storage surface of the target cartridge.

Preferably, the data and its identifier are written to the target cartridge substantially adjacent to the data identifier (if any) most recently written along the target cartridge's data path. In other words, task 420 ensures that each subsequent data block and associated identifier are concatenated to previous data blocks and identifiers in substantially continuous form along the target cartridge's data path. Thus, if each identifier precedes its respective data block, the data blocks on a target cartridge are all separated by intervening identifiers. By concatenating data from the cache 106, the target cartridge's storage space is efficiently preserved.

After task 420, task 422 updates the catalog 128, associating the recently written data block with its location in the library 108. After task 422, task 424 determines whether all data identified in task 404 have been processed. If not, the next identified block of data is selected in task 426, and processing of that data continues in tasks 416–424. When task 424 finds no more datasets to process, the routine 400 ends in task 428.

Data Migration from Source Tape to Library

As an alternative to FIGS. 3–4, data may be migrated from source cartridges to target cartridges directly, skipping any intermediate storage in the cache 106. This is achieved by performing the steps 300 and 400 (FIGS. 3–4) with several modifications. Generally, the steps 300 and 400 may be performed concurrently, where the sequence 300 prepares source cartridges for migration and the sequence 400 prepares target cartridges for migration. However, in task 318 data is not copied from a source cartridge to cache 106— instead, it is copied to a target cartridge as shown in task 420. Therefore, in this embodiment, tasks 318 and 420 are the same. Another difference is that task 404 simply involves identifying the source data that has been prepared for migration by the sequence 300.

As another alternative, the operator may be permitted to selectively designate cartridges as "active" or "inactive", where inactive cartridges are migrated directly to target tape (as described immediately above), and where active cartridges are stored in the cache 106 as shown in FIG. 3.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A data migration method, comprising the steps of:

receiving a plurality of input tape cartridges into a tape cartridge library, each tape cartridge containing a data block and an associated unique identifier readable from said tape cartridge;

from each tape cartridge, reading the identifier associated with the data block of that tape cartridge;

copying the data blocks and their associated identifiers from the input tape cartridges to a single output tape cartridge, said output tape cartridge defining a data storage path, each data block being written to the output tape cartridge substantially adjacent its associated identifier, the data blocks and identifiers being written in substantially continuous form along the data storage path; and updating a catalog to link each copied identifier with the output tape cartridge and delete any previous links of the copied identifiers to other cartridges.

2. The method of claim 1, the copying step comprising:

a first step of copying some of the data blocks and their associated identifiers to a first output tape cartridge; and a second step of copying others of the data blocks and their associated identifiers from the input tape cartridges to a second output tape cartridge.

3. The method of claim 1, the unique identifiers being volume serial numbers.

4. The method of claim 1, each tape cartridge including a tape medium and a media housing, the reading step comprising a step of reading a machine-readable code provided by the media housing.

5. The method of claim 1, each tape cartridge including a tape medium and a media housing, the reading step reading a machine-readable code from the tape medium.

6. The method of claim 1, the data storage path comprising a serpentine data storage path.

7. The method of claim 1, the receiving step comprising a step of a human operator placing the plurality of input tape cartridges into a tape loader of the tape cartridge library.

8. The method of claim 1, the tape cartridges comprising magnetic tape storage units.

9. A data migration method, comprising the steps of:

receiving a plurality of input tape cartridges into a tape cartridge library, each tape cartridge containing a data block and an associated unique identifier readable from said tape cartridge;

from each tape cartridge, reading the identifier associated with the data block of that tape cartridge;

copying the data blocks and the identifiers from the input tape cartridges to a cache storage device;

copying selected data blocks and their associated identifiers from the cache storage device to an output tape cartridge maintained in an automated tape cartridge library, the output tape cartridge defining a data storage path, each data block being written to the output tape cartridge substantially adjacent to its associated identifier, the data blocks and identifiers being written in substantially continuous form along the data storage path; and updating a catalog to link each identifier copied to the output tape cartridge with the output tape cartridge and delete any previous links of said identifier to other storage sites.

10. A method of migrating data comprising the steps of:

loading a plurality of input tape media units to a loading mechanism of the tape library, each input tape media unit having stored therein a data block, each input tape media unit containing a machine-readable identifier associated with the data block stored therein;

using the input tape media units to determine the identifiers associated with the data blocks;

consolidating the data blocks and the identifiers onto multiple output tape media units, each data block and associated identifier being stored together on the same output tape media unit, the data blocks and identifiers on each output tape media unit being written in substantially contiguous form on the output tape media units, wherein data blocks and associated identifiers on each output tape media unit are positioned in a predetermined relationship relative to each other; and creating a current catalog correlating each consolidated data block with an output tape media unit containing the consolidated data block.

11. The method of claim 10, the step of creating the current catalog comprising the steps of forming the current catalog anew.

12. The method of claim 10, the step of creating the current catalog comprising the steps of updating an existing catalog.

13. A method of consolidating data, comprising the steps of:

receiving multiple source tape cartridges into a tape cartridge library, each source tape cartridge containing a data block and an associated unique identifier readable from said source tape cartridge;

from each source tape cartridge, reading the identifier associated with the data block stored on that source tape cartridge;

sequentially copying each data block and its associated identifier to a single target tape cartridge, the target tape cartridge defining a data path, each subsequent data block and associated identifier being concatenated to previous data blocks and identifiers in substantially continuous form along the data path; and updating a catalog to link each copied identifier with the target tape cartridge and delete any previous links of the copied identifiers to other cartridges.

14. A method of migrating data, comprising the steps of:

receiving a plurality of input tape cartridges, each tape cartridge containing a data block and an associated unique identifier readable from said input tape cartridge;

from each input tape cartridge, reading the identifier associated with the data block contained on that input tape cartridge;

copying the data blocks from the input tape cartridges to prescribed locations in a cache, and also writing the identifiers to the cache;

updating a catalog to link each identifier with the corresponding prescribed location in cache and to delete any previous links of the identifiers to other storage locations;

copying the data blocks and the identifiers from the cache to a single output tape cartridge, said output tape cartridge defining a data storage path, each data block being written to the output tape cartridge substantially adjacent to its associated identifier, the data blocks and identifiers being written in substantially continuous form along the data storage path; and updating the catalog to link each identifier with the output tape cartridge and delete any previous links of the identifiers to other storage locations.

15. The method of claim 14, the cache comprising a magnetic data storage disk drive.

16. The method of claim 14, the cache comprising random access memory.

17. An article of manufacture comprising a data storage medium tangibly embodying a program of machine-readable instructions executable by a digital processing apparatus to perform method steps for data migration, said method steps comprising:

receiving a plurality of input tape cartridges into a tape cartridge library, each tape cartridge containing a data block and an associated unique identifier readable from said tape cartridge;

from each tape cartridge, reading the identifier associated with the data block of that tape cartridge;

copying the data blocks and their associated identifiers from the input tape cartridges to a single output tape cartridge, said output tape cartridge defining a data storage path, each data block being written to the output tape cartridge substantially adjacent to its associated identifier, the data blocks and identifiers being written in substantially continuous form along the data storage path; and updating a catalog to link each copied identifier with the output tape cartridge and delete any previous links of the copied identifiers to other cartridges.

18. An article of manufacture comprising a data storage medium tangibly embodying a program of machine-readable instructions executable by a digital processing apparatus to perform method steps for data migration, said method steps comprising:

receiving a plurality of input tape cartridges into a tape cartridge library, each tape cartridge containing a data block and an associated unique identifier readable from said tape cartridge;

from each tape cartridge, reading the identifier associated with the data block of that tape cartridge;

copying the data blocks and the identifiers from the input tape cartridges to a cache storage device;

copying selected data blocks and their associated identifiers from the cache storage device to an output tape cartridge maintained in an automated tape cartridge library, the output tape cartridge defining a data storage path, each data block being written to the output tape cartridge substantially adjacent to its associated identifier, the data blocks and identifiers being written in substantially continuous form along the data storage path; and updating a catalog to link each identifier copied to the output tape cartridge with the output tape cartridge and delete any previous links of said identifier to other storage sites.

19. An article of manufacture comprising a data storage medium tangibly embodying a program of machine-readable instructions executable by a digital processing apparatus to perform method steps for migrating data using an automated tape library, said method steps comprising:

loading a plurality of input tape media units to a loading mechanism of the tape library, each input tape media unit having stored therein a data block, each input tape media unit containing a machine-readable identifier associated with the data block stored therein;

using the input tape media units to determine the identifiers associated with the data blocks;

consolidating the data blocks and the identifiers onto multiple output tape media units, each data block and associated identifier being stored together on the same output tape media unit, the data blocks and identifiers on each output tape media unit being written in substantially contiguous form on the output tape media units, wherein data blocks and associated identifiers on each output tape media unit are positioned in a predetermined relationship relative to each other; and creating a current catalog correlating each consolidated data block with an output tape media unit containing the consolidated data block.

20. An article of manufacture comprising a data storage medium tangibly embodying a program of machine-readable instructions executable by a digital processing apparatus to perform method steps for consolidating data, said method steps comprising:

receiving multiple source tape cartridges into a tape cartridge library, each source tape cartridge containing a data block and an associated unique identifier readable from said source tape cartridge;

from each source tape cartridge, reading the identifier associated with the data block stored on that source tape cartridge;

sequentially copying each data block and its associated identifier to a single target tape cartridge, the target tape cartridge defining a data path, each subsequent data block and associated identifier being concatenated to previous data blocks and identifiers in substantially continuous form along the data path; and updating a catalog to link each copied identifier with the target tape cartridge and delete any previous links of the copied identifiers to other cartridges.

21. An article of manufacture comprising a data storage medium tangibly embodying a program of machine-readable instructions executable by a digital processing apparatus to perform method steps for dat migration, said method steps comprising:

receiving a plurality of input tape cartridges, each tape cartridge containing a data block and an associated unique identifier readable from said input tape cartridge;

from each input tape cartridge, reading the identifier associated with the data block contained on that input tape cartridge;

copying the data blocks from the input tape cartridges to prescribed locations in a cache, and also writing the identifiers to the cache;

updating a catalog to link each identifier with the corresponding prescribed location in cache and to delete any previous links of the identifiers to other storage locations;

copying the data blocks and the identifiers from the cache to a single output tape cartridge, said output tape cartridge defining a data storage path, each data block being written to the output tape cartridge substantially adjacent its associated identifier, the data blocks and identifiers being written in substantially continuous form along the data storage path; and updating the catalog to link each identifier with the output tape cartridge and delete any previous links of the identifiers to other storage locations.

22. A data migration apparatus, comprising:

a tape cartridge library having at least one tape drive; and a library manager coupled to the library, the library manager being programmed to perform method steps comprising:

receiving a plurality of input tape cartridges into the tape cartridge library, each tape cartridge containing a data block and an associated unique identifier readable from said tape cartridge;

from each tape cartridge, reading the identifier associated with the data block of that tape cartridge;

copying the data blocks and their associated identifiers from the input tape cartridges to a single output tape cartridge, said output tape cartridge defining a data storage path, each data block being written to the output tape cartridge substantially adjacent its associated identifier, the data blocks and identifiers being written in substantially continuous form along the data storage path; and updating a catalog to link each copied identifier with the output tape cartridge and delete any previous links of the copied identifiers to other cartridges.

23. The data migration of claim 22, the tape cartridge library including at least one source tape drive and at least one target tape drive.

24. The data migration apparatus of claim 22 the method steps further comprising:

a first step of copying some of the data blocks and their associated identifiers to a first output tape cartridge; and a second step of copying others of the data blocks and their associated identifiers from the input tape cartridges to a second output tape cartridge.

25. The data migration apparatus of claim 22, the unique identifiers being volume serial numbers.

26. The data migration apparatus of claim 22, each tape cartridge including a tape medium and a media housing, the reading step comprising a step of reading a machine-readable code provided by the media housing.

27. The data migration apparatus of claim 22, each tape cartridge including a tape medium and a media housing, the reading step reading a machine-readable code from the tape medium.

28. The data migration apparatus of claim 22, the data storage path comprising a serpentine data storage path.

29. The data migration apparatus of claim 22, the receiving step comprising a step of a human operator placing the plurality of input tape cartridges into a tape loader of the tape cartridge library.

30. The data migration apparatus of claim 22, the tape cartridges comprising magnetic tape storage units.

31. A data migration apparatus, comprising:

a tape cartridge library having at least one tape drive; and a library manager coupled to the library, the library manager being programmed to perform steps comprising:

receiving a plurality of input tape cartridges into a tape cartridge library, each tape cartridge containing a data block and an associated unique identifier readable from said tape cartridge;

from each tape cartridge, reading the identifier associated with the data block of that tape cartridge;

copying the data blocks and the identifiers from the input tape cartridges to a cache storage device;

copying selected data blocks and their associated identifiers from the cache storage device to an output tape cartridge maintained in an automated tape cartridge library, the output tape cartridge defining a data storage path, each data block being written to the output tape cartridge substantially adjacent to its associated identifier, the data blocks and identifiers being written in substantially continuous form along the data storage path; and updating a catalog to link each identifier copied to the output tape cartridge with the output tape cartridge and delete any previous links of said identifier to other storage sites.

32. An apparatus for migrating data, comprising:

a tape cartridge library having at least one tape drive; and a library manager coupled to the library, the library manager being programmed to perform steps comprising:

loading a plurality of input tape media units to a loading mechanism of the tape library, each input tape media unit having stored therein a data block, each input tape media unit containing a machine-readable identifier associated with the data block stored therein;

using the input tape media units to determine the identifiers associated with the data blocks;

consolidating the data blocks and the identifiers onto multiple output tape media units, each data block and associated identifier being stored together on the same output tape media unit, the data blocks and identifiers on each output tape media unit being written in substantially contiguous form on the output tape media units, wherein data blocks and associated identifiers on each output tape media unit are positioned in a predetermined relationship relative to each other; and creating a current catalog correlating each consolidated data block with an output tape media unit containing the consolidated data block.

33. The apparatus of claim 32, the tape cartridge library including at least one source tape drive and at least one target tape drive.

34. The apparatus of claim 32, the step of creating the current catalog comprising the steps of forming the current catalog anew.

35. The apparatus of claim 32, the step of creating the current catalog comprising the steps of updating an existing catalog.

36. An apparatus for migrating data, comprising:

a tape cartridge library having at least one tape drive; and a library manager coupled to the library, the library manager being programmed to perform steps comprising:

receiving multiple source tape cartridges into a tape cartridge library, each source tape cartridge containing a data block and an associated unique identifier readable from said source tape cartridge;

from each source tape cartridge, reading the identifier associated with the data block stored on that source tape cartridge;

sequentially copying each data block and its associated identifier to a single target tape cartridge, the target tape cartridge defining a data path, each subsequent data block and associated identifier being concatenated to previous data blocks and identifiers in substantially continuous form along the data path; and updating a catalog to link each copied identifier with the target tape cartridge and delete any previous links of the copied identifiers to other cartridges.

37. The apparatus for migrating data of claim 36, the tape cartridge library including at least one source tape drive and at least one target tape drive.

38. An apparatus for migrating data, comprising:

a tape cartridge library having at least one tape drive;

a cache; and a storage interface coupled to the library and the cache, the library manager being programmed to perform steps comprising:

receiving a plurality of input tape cartridges, each tape cartridge containing a data block and an associated unique identifier readable from said input tape cartridge;

from each input tape cartridge, reading the identifier associated with the data block of that tape cartridge;

copying the data blocks from the input tape cartridges to prescribed locations in a cache, and also writing the identifiers to the cache;

updating a catalog to link each identifier with the corresponding prescribed location in cache and to delete any previous links of the identifiers to other storage locations;

copying the data blocks and the identifiers from the cache to a single output tape cartridge, said output tape cartridge defining a data storage path, each data block being written to the output tape cartridge substantially adjacent its associated identifier, the data blocks and identifiers being written in substantially continuous form along the data storage path; and updating the catalog to link each identifier with the output tape cartridge and delete any previous links of the identifiers to other storage locations.

39. The apparatus for migrating data of claim 38, the cache comprising a magnetic data storage disk drive.

40. The apparatus for migrating data of claim 38, the cache comprising random access memory.

* * * * *